United States Patent
Leckey et al.

(10) Patent No.: US 10,305,974 B2
(45) Date of Patent: May 28, 2019

(54) RANKING SYSTEM

(71) Applicant: Intel Corporation, Santa Clara, CA (US)

(72) Inventors: Alexander Leckey, Kilcock (IE); Joseph M. Butler, Stamullen Co Meath (IE); Thijs Metsch, Cologne (DE); Giovani Estrada, Dublin (IE); Vincenzo M. Riccobene, Leixlip (IE); John M. Kennedy, Clane (IE)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 14/757,775

(22) Filed: Dec. 23, 2015

(65) Prior Publication Data

US 2017/0187790 A1    Jun. 29, 2017

(51) Int. Cl.
*H04L 29/08* (2006.01)
*H04L 12/24* (2006.01)

(52) U.S. Cl.
CPC ...... *H04L 67/1008* (2013.01); *H04L 41/5025* (2013.01)

(58) Field of Classification Search
CPC . H04L 41/5019; H04L 67/1008; H04L 67/10; H04L 43/0888; H04L 41/505; H04L 65/80; G06F 2009/4557; G06F 9/4555; G06F 17/30598; G06F 2009/45579; G06F 2209/501; G06F 9/5027; G06F 17/30705; G06F 9/45558; G06F 9/5083; G06F 11/1464; G06F 15/177; G06F 9/45533; G06F 9/5005; G06F 9/5077; G06F 21/552
See application file for complete search history.

(56) References Cited

U.S. PATENT DOCUMENTS

2006/0069776 A1    3/2006 Shim et al.
2009/0300173 A1    12/2009 Bakman
(Continued)

FOREIGN PATENT DOCUMENTS

| WO | 2015130613 A1 | 9/2015 |
| WO | 2015021357    | 12/2015 |
| WO | 2016105732 A1 | 6/2016 |

OTHER PUBLICATIONS

International Search Report and Written Opinion issued in PCT Application No. PCT/US2015/061787, dated Mar. 7, 2016, 15 pages.
(Continued)

*Primary Examiner* — SM A Rahman
*Assistant Examiner* — Ranjan Pant
(74) *Attorney, Agent, or Firm* — Grossman, Tucker, Perreault & Pfleger, PLLC (57) ABSTRACT

One embodiment provides an apparatus. The apparatus includes ranker logic. The ranker logic is to rank each of a plurality of compute nodes in a data center based, at least in part, on a respective node score. Each node score is determined based, at least in part, on a utilization (U), a saturation parameter (S) and a capacity factor ($C_i$). The capacity factor is determined based, at least in part, on a sold capacity ($C_s$) related to the compute node. The ranker logic is further to select one compute node with a highest node score for placement of a received workload.

15 Claims, 4 Drawing Sheets

(56) References Cited

U.S. PATENT DOCUMENTS

| | | | |
|---|---|---|---|
| 2010/0332674 A1* | 12/2010 | van Gassel | H04L 67/104 709/231 |
| 2011/0153724 A1* | 6/2011 | Raja | H04L 67/325 709/203 |
| 2012/0117229 A1 | 5/2012 | Van Biljon et al. | |
| 2012/0287931 A1 | 11/2012 | Kidambi et al. | |
| 2013/0091282 A1* | 4/2013 | Tontiruttananon | G06F 9/5061 709/226 |
| 2013/0097304 A1 | 4/2013 | Asthana et al. | |
| 2013/0182002 A1* | 7/2013 | Macciola | H04N 1/387 345/589 |
| 2014/0095691 A1 | 4/2014 | Ganguli et al. | |
| 2014/0122706 A1* | 5/2014 | Boerner | H04L 41/12 709/224 |
| 2014/0365664 A1 | 12/2014 | Yeow et al. | |
| 2015/0263983 A1* | 9/2015 | Brennan | H04L 47/70 709/226 |
| 2015/0370601 A1* | 12/2015 | Ghosh | G06F 9/45533 718/105 |
| 2016/0103699 A1* | 4/2016 | Thakkar | G06F 9/45558 718/1 |
| 2016/0182320 A1 | 6/2016 | Bartfai-Walcott | |

OTHER PUBLICATIONS

Kang et al.: "Software-Defined Infrastructure and the SAVI Testbed", International Conference on Testbeds and Research Infrastructures, Development of Networks and Communities, ICST Conference, China, May 5-7, 2014, Online Nov. 26, 2014, Abstract only, 5 pages.
International Search Report and Written Opinion issued in PCT Application No. PCT/US2016/063691, dated Feb. 17, 2017, 12 pages.

\* cited by examiner

RANKING SYSTEM

FIELD

The present disclosure relates to a system, in particular to, a ranking system.

BACKGROUND

An orchestrator may schedule workload placements in "the cloud" (e.g., in a data center). Scheduling workload placement includes selecting a target compute host from a number of compute hosts. The workload may then be placed on the target compute host. One or more of a number of selection techniques may be utilized to select the target compute host, e.g., random selection, identifying and selecting a least-loaded compute host or randomly selecting a compute host from a plurality of compute hosts included in an availability zone. The number of compute hosts may be relatively large and the selection techniques may not necessarily make an optimum selection. For example, the orchestrator may place workloads onto target compute hosts based on a nominal capacity of each compute host before moving on to a next host (e.g., a bin packing scheduler). In another example, the orchestrator may consider only the compute resource and may ignore related resources such as network interfaces, memory architecture, etc.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to a ranking system. An apparatus, method and/or system are configured to rank a plurality of compute nodes based, at least in part, on a score. The ranking may be performed in response to a request to schedule a workload based, at least in part, on acquired element and/or node scores determined periodically. An element score may be determined for each physical element contained in and/or in proximity to a compute node based, at least in part, on utilization, a saturation parameter and a capacity factor related to a sold capacity. The utilization, saturation parameter and sold capacity may be determined based, at least in part, on acquired telemetry data. A node score may be determined for the compute node based, at least in part, on the element scores of the elements contained in the compute node. The compute node with the highest node score may then be selected for placement of the workload. The element scores and node score may be determined periodically. The ranking may be determined and/or a compute node with a relatively highest associated ranking may be selected in response to a request to place a workload.

The apparatus, method and/or system may be further configured to identify one or more attributes of the workload and to identify one or more features associated with data center physical elements that correspond to the identified attributes. Data center physical elements that have the features may then be identified. Thus, workload attributes and element features may be considered when placing the workload. Target compute nodes may thus be ranked according to the node score that considers more than nominal capacity.

Figure 1:
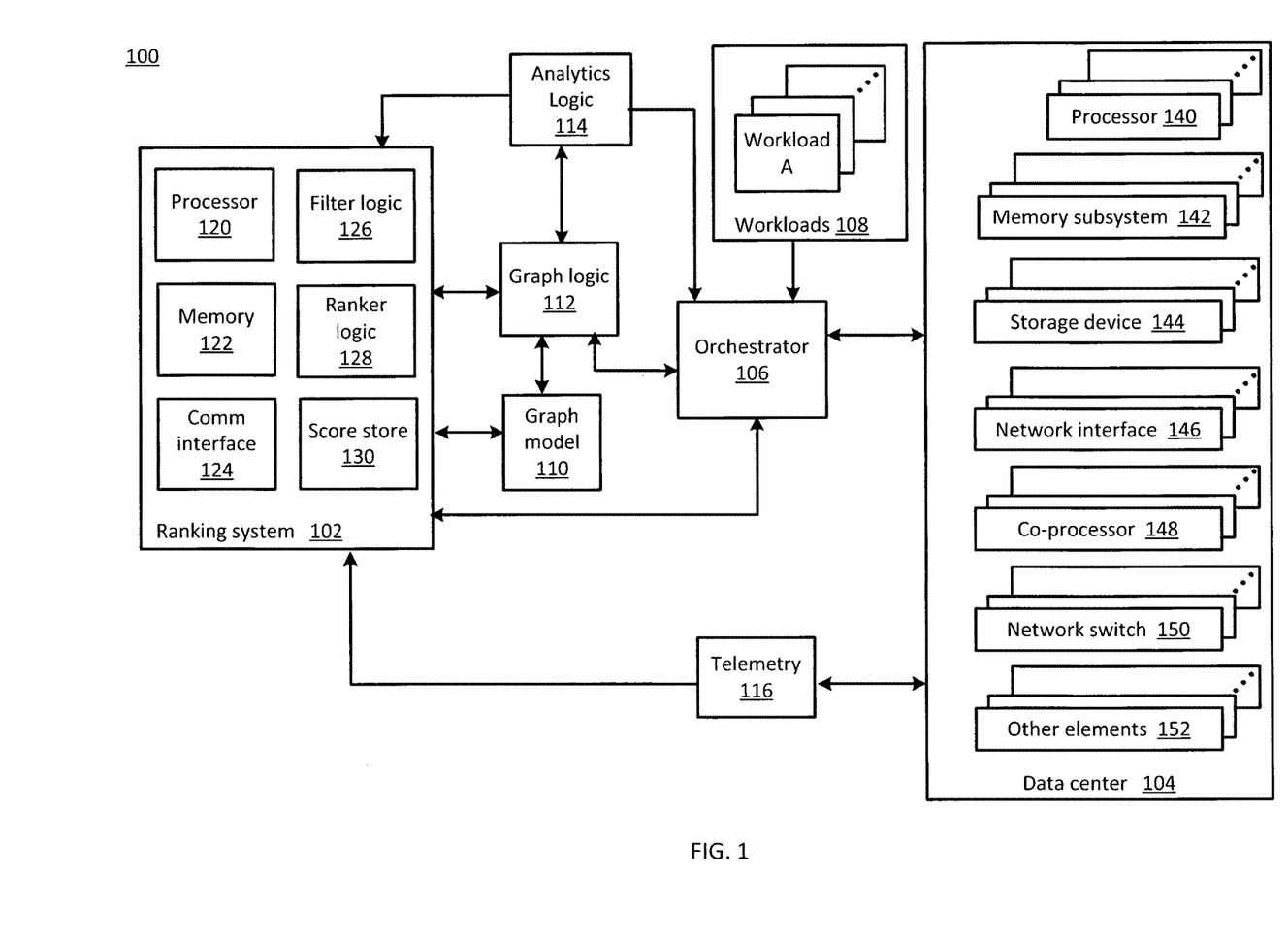
FIG. 1 illustrates a functional block diagram of system including a ranking system consistent with several embodiments of the present disclosure.

FIG. 1 illustrates a functional block diagram of a system 100 including a ranking system 102 consistent with several embodiments of the present disclosure. System 100 includes the ranking system 102, data center 104, an orchestrator 106, a graph model 110, graph logic 112, analytics logic 114 and telemetry 116. System 100 may further include a plurality of workloads 108, e.g., workload A. Workloads 108 may include virtual machines, container instances and/or other workloads, as described herein.

Data center 104 includes a plurality of physical elements. The physical elements may include a plurality of processors, e.g., processor 140, a plurality of memory subsystems, e.g., memory subsystem 142, a plurality of storage devices, e.g., storage device 144, a plurality of network interfaces, e.g., network interface 146, one or more coprocessors, e.g., coprocessor 148, a plurality of network switches, e.g., network switch 150, and/or one or more other elements, e.g., other element 152. Other elements may include, but are not limited to, physical plant, i.e., facilities, e.g., cooling elements. Each processor 140 may include one or more processing units, i.e., cores. Each processor 140 may further include (i.e., contain) a performance monitoring unit (PMU) configured to provide telemetry data, as described herein. Memory subsystem 142 may include any type of memory, as described herein. Storage devices 144 may include, e.g., hard disk drives, solid state drives, removable storage, etc.

The physical elements may be arranged in racks, either conventionally (e.g., processors, storage devices and network interfaces aggregated into servers, microservers, etc.) or in disaggregated pools of physical elements (e.g., a rack tray of compute resources (processors), a rack tray of storage resources, a rack tray of network resources). For example, the physical elements may be configured as a disaggregation of resources in a rack. For example, the disaggregation of physical resources comply with an Intel® Rack Scale Architecture.

One or more physical elements may be logically combined by, e.g., orchestrator 106, into a compute node. For example, a first compute node may be configured to include a processor 140, a memory subsystem 142, a network interface 146 and/or a coprocessor 148. In another example, a second compute node may be configured to include a processor, a memory subsystem, and a network switch. Thus, data center 104 may contain a plurality of configured compute nodes, with each compute node configured to contain one or more physical elements.

Graph model 110 corresponds to a model of data center 104 that includes the plurality of compute nodes, associated physical elements and corresponding features as well as interconnections, interrelationships and environmental features (i.e., deployment context). Graph model 110 may further include virtualized elements and/or placed services, e.g., workloads. Graph model 110 may be managed by graph logic 112. Graph model 110 may include information related to logical combinations of physical elements, virtual elements (e.g., virtual machines (e.g., hypervisor and one or more isolated operating systems), virtual network elements (e.g., virtual switch, virtual network interface, virtual network), container instances (e.g., one operating system and one or more isolated applications), workload elements (e.g., web server workloads, video processing workloads, database workloads) and/or service elements (e.g., management services, message queue services, security services).

The features included in graph model 110 may be element specific. Features associated with processors may include one or more of number of cores, processor speed, cache architecture, memory architecture (e.g., non-uniform memory access (NUMA)), instruction set architecture (ISA), etc. Features associated with network interfaces may include bandwidth, number of physical ports, etc. Thus, graph model 110 corresponds to a representation of the configuration of the physical elements included in data center 104 and their associated features. Graph model 110 further includes virtualized elements and placed services.

Orchestrator 106 is configured to activate, control and configure the physical elements of data center 104. The orchestrator 106 is configured to manage combining data center 104 physical elements into compute nodes, i.e., to configure the compute nodes. The orchestrator 106 is further configured to manage placement of workloads onto the compute nodes, i.e., to select a compute node on which to place a respective workload and to manage compute node sharing by a plurality of workloads. Orchestrator 106 may correspond to a cloud management platform, e.g., OpenStack® (cloud operating system), CloudStack® (cloud computing software) or Amazon Web Services (AWS).

Analytics logic 114 is configured to monitor performance of scheduled and placed workloads. Analytics logic 114 may be further configured to trigger a rebalancing of a selected workload if the selected workload is not meeting an associated performance target. For example, analytics logic 114 may be further configured to trigger rescheduling (i.e. a new placement of) an existing workload in response to detecting a service level agreement (SLA) violation associated with the existing workload. As a result, the existing workload may be scheduled to a different compute node, as described herein. In other words, analytics logic 114 may trigger scheduling and placement of a workload that may then initiate ranking operations, as described herein. The workload, e.g., the existing workload, may then be placed based, at least in part, on updated node score(s) associated with one or more compute nodes, as described herein.

Ranking system 102 may include processor 120, memory 122 and communication interface 124. Processor 120 is configured to perform operations of ranking system 102. Memory 122 is configured to store data associated with operation of ranking system 102. Communication interface 124 is configured to provide communication capability to ranking system 102. For example, communication interface 124 may be configured to communicate wired and/or wirelessly with orchestrator 106, graph logic 112, analytics logic 114 and/or telemetry 116.

Ranking system 102 may include filter logic 126, ranker logic 128 and score store 130. Filter logic 126 is configured to identify one or more physical elements that have features that correspond to attributes of a workload to be placed, as described herein. Ranker logic 128 is configured to determine an associated score for each identified physical element and for a compute node that includes one or more identified physical elements. Operations of ranker logic 128 may be performed periodically and results may be stored to, e.g., score store 130. Operations of filter logic 126 may be initiated in response to receiving an indication of a workload to schedule from, e.g., orchestrator 106 and/or analytics logic 114. For example, the orchestrator 106 may provide notice of a new workload to schedule. In another example, analytics logic 114 may provide notice of an existing workload to be scheduled, related to rebalancing. In another example, workload rescheduling and placement may be triggered based, at least in part, on an elapsed time since a prior placement.

Filter logic 126 is configured to identify one or more attributes of the workload to be scheduled. Attributes may include, but are not limited to, whether the workload is computation intensive, whether the workload is memory access intensive, whether the workload includes one or more subsystems, expected utilization, etc. Attributes may further include resource requirements (e.g., special purpose processor), composition conditions (e.g., geographic location) and/or policy constraints (e.g., solid state devices with certain speed guarantees). In some situations, workload attributes may be known a priori.

One or more descriptors corresponding to workload attributes may be included with the workload. For example, a video encoding workload may be highly computationally (i.e., processor) intensive, thus, information related to a type of workload may provide workload attribute information. In some situations, workload attributes may not be known a priori. Some workload attributes may be learned over time and may thus be considered if a workload is rescheduled.

Filter logic 126 may be configured to identify features that correspond to identified workload attributes. Features may include physical element-related features and/or compute node-related features. Physical element-related features may include, for example, processor speed, processor architecture, network interface bandwidth, memory architecture (e.g., NUMA), etc. Compute node-related features are related to combinations of physical elements. Compute node-related features may include, for example, availability of coprocessors (e.g., Intel® Xeon® Phi coprocessor), ISA, whether a physical network interface is local to a selected processor, dependent services running locally, etc.

Dependent services running locally may be related to the compute node and/or the environment that includes the compute node. For example, a dependent service running locally may include availability of a network switch to a compute node. In another example, for a workload that processes data (i.e., attribute is processes data), a dependent service running locally may include proximity of memory and/or storage to a processor, i.e., proximity of the data. Dependent services running locally may further include compositional information, e.g., the workload needs to be all in one rack, all in one server or, for fault tolerance, distributed over multiple data centers.

Filter logic 126 may then be configured to identify elements included in data center 104 that have the identified features. For example, filter logic 126 may be configured to traverse graph model 110, i.e., access graph model 110 directly and/or graph model 110 via graph logic 112, to identify the elements. Filter logic 126 may be configured to identify compute nodes in data center 104 that have one or more of the identified features. Only those physical elements and/or compute nodes that have the identified features may then be ranked, as described herein. Such filtering may facilitate "real time" ranking of physical elements and/or compute nodes by ranking only those physical elements and/or nodes that have the identified features.

Filter logic 126 may then be configured to identify one or more compute node(s) that contain the identified elements. Filter logic 126, ranker logic 128 and/or orchestrator 106 may then be configured to acquire a node score for each identified compute node. The node score may have been determined prior to receiving an indication of a workload to schedule.

Ranker logic 128 and/or orchestrator 106 may then be configured to select the compute node with the highest node score for placement of the received workload, e.g., workload A. For example, ranker logic 128 may be configured to provide one or more compute node identifiers and associated node scores to orchestrator 106. The compute node identifiers and associated node scores may be provided in an ordered list, i.e., ranked, from highest node score to least node score. In another example, ranker logic 128 may be configured to provide the compute node identifier associated with the maximum node score to orchestrator 106. Orchestrator 106 may then be configured to schedule, i.e., place, the received workload to the highest ranked compute node.

Ranker logic 128 is configured to determine element scores and corresponding node scores periodically. The element scores and node score(s) may be stored to, e.g., score store 130 and/or may be stored to graph model 110. Ranker logic 128 may be configured to determine element and node scores based, at least in part, on telemetry data.

Telemetry 116 is configured to capture the telemetry data. Telemetry data may be acquired periodically. Telemetry data may include, but is not limited to, power information, performance parameters, security information, temperature information, utilization data and location information. For example, telemetry 116 may include a performance monitor, e.g., Intel® performance counter monitor (PCM), configured to detect, for processors, processor utilization, core operating frequency, cache hits and/or misses. Telemetry 116 may be further configured to detect an amount of data written to and read from, e.g., memory controllers associated with processor 140, memory subsystem 142 and/or storage device 144. In another example, telemetry 116 may include one or more Java performance monitoring tools (e.g., jvmstat, a statistics logging tool) configured to monitor performance of Java virtual machines, UNIX® and UNIX-like performance monitoring tools (e.g., vmstat, iostat, mpstat, ntstat, kstat) configured to monitor operating system interaction with physical elements.

Telemetry data for the identified elements may then be acquired from telemetry 116. For example, the telemetry data may be acquired by filter logic 126 and/or ranker logic 128. Ranker logic 128 may then be configured to determine an element score for each identified element and a node score for each configured compute node that contains the identified elements. The scores may be determined based, at least in part, on acquired telemetry data. For example, the acquired telemetry data may include utilization, a saturation parameter and a capacity value (i.e., a sold capacity).

The element score may be determined as:

$$score_i = (1 - S_i) * \frac{C_i}{1 + U_i}$$

where i is an index corresponding to an element, $S_i$ is a saturation parameter, $U_i$ is utilization and $C_i$ is a capacity factor. The capacity factor, $C_i$, is related to a sold capacity, $C_s$, as described herein. The node score may then be determined based, at least in part, on the element scores of the physical elements included in and/or in proximity to the corresponding configured compute node. For example, the node score may be an average of the element scores. In another example, the node score may be a weighted combination, e.g., weighted average, of the element scores.

The saturation parameter, $S_i$, the utilization, $U_i$, and the sold capacity, $C_s$, may be determined, e.g., periodically, at each expiration of a data acquisition interval. For example, a duration of the data acquisition interval may be on the order of ones of minutes. In another example, the duration of the data acquisition interval may be less than one minute. In another example the duration of the data acquisition interval may be greater than or equal to 10 minutes. The saturation parameter, $S_i$, the utilization, $U_i$, and the sold capacity, $C_s$, determined at the expiration of each data acquisition interval may be determined for a look back period. The look back period corresponds to a sliding window in which samples related to $S_i$, $U_i$ and $C_s$ are captured and averaged to determine $S_i$, $U_i$ and $C_s$, respectively. For example, a duration of the look back period may be 10 minutes. In another example, the duration of the look back period may be greater than or less than ten minutes. A number of samples captured during the look back period is related to a sample interval. The sample interval corresponds to an amount of time elapsed between samples. Thus, $S_i$, $U_i$ and $C_s$ may be determined at the expiration of each data acquisition interval based on the number of samples captured at the sample intervals during the look back period that preceded the expiration of the data acquisition interval.

The utilization, $U_i$, is determined based, at least in part, on a maximum capacity and based, at least in part, on an amount of the capacity of a resource that is in use. The utilization, $U_i$, corresponds to an average time duration that a physical element is performing work. The utilization, $U_i$, of a physical element for each data acquisition interval may correspond to an average of the utilization determined each sample interval over the look back period. The utilization is related to the type of physical element. For example, the utilization of a processor may correspond to a ratio of the number of active cores to the total number of cores included in the processor. In another example, for a processor core, utilization may correspond to a ratio of a current number of processor cycles to a maximum number of processor cycles in a time interval. In another example, for a network interface, the utilization may correspond to a ratio of bandwidth being utilized to the maximum bandwidth of the network interface. In another example, for storage devices, utilization may correspond to the ratio of possible IO operations versus the currently executed IO operations. Thus, utilization may be determined for each identified physical element for each data acquisition interval.

The saturation parameter, $S_i$, is related to whether a physical element is saturated or not. Saturation is related to a degree to which a physical element has extra work that it cannot immediately service. The extra work may then be queued until the physical element is able to service it. The saturation parameter, $S_i$, may be determined as:

$$S_i = \frac{\text{number of samples where sat} > 0}{\text{total number of samples}}$$

In other words, unlike percent utilization, saturation corresponds to a state, i.e., saturated or not saturated. Thus, raw saturation data may not provide an appropriate measure between zero and one. The saturation parameter, $S_i$, is defined as a ratio of a count of a number of samples where the physical element was saturated to the total number of samples over the look back period. If no saturation is present, then the saturation parameter is zero. If the physical element is saturated for the entire look back period, then the saturation parameter is one. Thus, the saturation parameter, $S_i$, may have a value between zero and one, inclusive.

The sold capacity, $C_s$, is determined based, at least in part, on a nominal capacity and based, at least in part, on an amount of capacity that is allocated. A data center administrator may sell more capacity than a physical element and/or compute node possesses (i.e., implement oversubscription). A resource (e.g., a physical element and/or a compute node) that is oversold has an allocated capacity greater than a nominal capacity. In other words, more workloads may be placed on a resource than the physical capacity of that resource can support at one time. The resource may then be shared by a plurality of workloads in time slices. As sold capacity increases, performance may be degraded and SLA violations may increase.

Sold capacity may be determined based, at least in part, on an allocated capacity acquired from, e.g., orchestrator 106. For example, an instantaneous allocated capacity may be acquired at each sample interval. An average allocated capacity may then be determined for the look back period. Sold capacity may then correspond to allocated divided by nominal capacity.

The capacity factor, $C_i$, may then be determined based, at least in part, on the sold capacity, $C_s$. The capacity factor has a range of zero to one, inclusive, where zero corresponds to no capacity available and one corresponds to capacity available. Capacity factor values between zero and one are configured to provide a weighting factor to the score.

The capacity factor, $C_i$, is further related to a nominal capacity, a guard capacity and a potential capacity. Nominal capacity corresponds to the physical capacity of each physical element. For example, for a processor, the physical capacity may correspond to the number of cores, a processor speed, a number of threads, etc. In another example, for a network interface, the physical capacity may correspond to the bandwidth of the network interface. In another example, for a storage device, the physical capacity may correspond to disk space.

The guard capacity corresponds to a guard factor multiplied by the nominal capacity. The guard factor is greater than or equal to one. The guard factor is configured to represent risk, i.e., a risk that an associated resource is sufficiently oversold that a service level agreement (SLA) may be violated. The guard factor may be selected and/or determined by, for example, a data center administrator. If the sold capacity is less than the guard capacity and greater than the nominal capacity, then the amount oversold is not considered a risk. For example, if the guard factor is equal to 2, then a sold capacity less than twice the nominal capacity may not be considered a risk by the data center administrator. The value of the guard factor may be determined by the data center administrator based, at least in part, on policy.

Similar to the guard capacity, the potential capacity equals a potential factor multiplied by the nominal capacity. The potential capacity corresponds to a maximum allowable sold capacity. The potential capacity is typically greater than the guard capacity. The potential factor may be set by an orchestrator, e.g., orchestrator 106. For example, for OpenStack®, a maximum potential factor for a processor is 15, thus, allowing a sold capacity for processors and associated cores that is 15 times the actual physical capacity. In other words, as many as 15 virtual cores may be associated with one physical core. Risk associated with a sold capacity between the guard capacity and the potential capacity may increase as the sold capacity increases. Sold capacity greater than the potential capacity may not be allowed.

In an embodiment, the capacity factor may be equal to one for sold capacity less than or equal to the guard capacity. The capacity factor may decrease linearly, to a threshold capacity, $C_T$, as sold capacity increases from the guard capacity to the potential capacity. A rate of decrease, i.e., a slope, is related to the capacity threshold, $C_T$, and the relative values of the guard factor and the potential factor. Sold capacity greater than the guard capacity represents an increasing risk of SLA violations as sold capacity increases from the guard capacity to the potential capacity. This increasing risk is represented in the score by a corresponding decrease as the sold capacity increases and the capacity factor decreases correspondingly.

Thus, the capacity factor may be set to one for sold capacity between zero and the guard capacity. The capacity factor may decrease, e.g., linearly, from one to a threshold capacity for sold capacity between the guard capacity and the potential capacity. The capacity factor may be equal to zero for sold capacity greater than the potential capacity.

Figure 2:
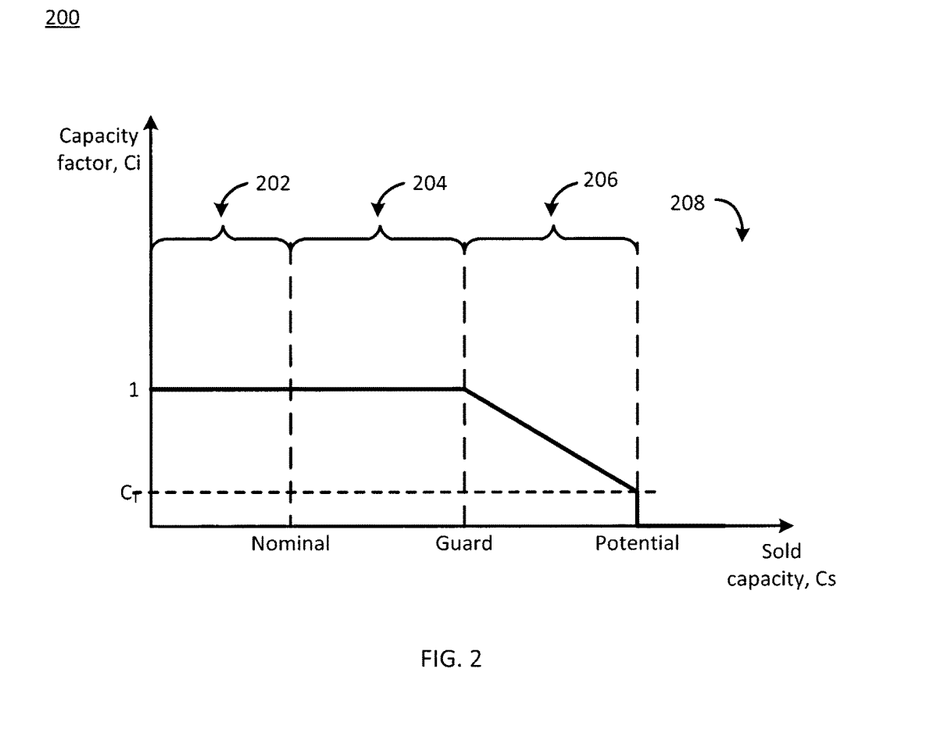
FIG. 2 is a plot illustrating a relationship between a capacity factor and sold capacity.

FIG. 2 is a plot 200 illustrating a relationship between the capacity factor, $C_i$, and the sold capacity, $C_s$. The vertical axis of plot 200 corresponds to the capacity factor, $C_i$, and the horizontal axis corresponds to sold capacity, $C_s$. Plot 200 includes four regions 202, 204, 206 and 208. The first region 202 corresponds to sold capacity between zero and the nominal capacity. In other words, the first region 202 corresponds to an under-allocated physical element and/or compute node. The second region 204 corresponds to sold capacity greater than the nominal capacity but less than a guard capacity. Operation in the second region 204 corresponds to oversold capacity, i.e., over allocated, but not considered a risk. For both the first region 202 and the second region 204, the capacity factor is equal to one. Thus, during operation in these two regions 202, 204, the associated score may not be reduced by the capacity factor.

The third region 206 corresponds to a sold capacity greater than the guard capacity but less than a potential capacity. The capacity factor in the third region 206 decreases from one to a capacity threshold, $C_T$. Operation in the third region 206 corresponds to increasingly oversold capacity, increasing risk and, thus, decreasing capacity factor and correspondingly decreasing score. The fourth region 208 corresponds to sold capacity greater than potential capacity, i.e., greater than allowed. In this fourth region, the capacity factor is zero and the score is zero. In other words, a physical element with a zero capacity factor and a corresponding score of zero may not be selected for workload placement.

Thus, a score may be determined periodically and/or intermittently for each physical element based, at least in part, on $S_i$, $U_i$, $C_s$ and $C_i$. The scores may be stored to score store 122 and/or graph model 110. The score may be determined based, at least in part, on acquired telemetry data. The score may be in the range of 0 to 1. The score may decrease as saturation increases, utilization increases and/or the capacity factor decreases. A score of zero corresponds to a physical element that is unavailable to receive a workload.

A node score may then be determined for each configured compute node that contains one or more identified elements. The node score may be determined by, e.g., ranker logic 128, and may be associated with the corresponding node and stored to, e.g., score store 130. For example, the node score may correspond to an average of the element scores for that compute node. In another example, the node score may correspond to a weighted average of the element scores. For example, a node score for a compute node that includes a processor and a network interface may correspond to an average of the element score for the processor and the element score for the network interface. Ranker logic 128 and/or orchestrator 106 may then select the compute node with the highest score, as described herein.

Thus, compute nodes may be selected for ranking based, at least in part, on available capacity and based, at least in part, on associated features. Whether a compute node selected for ranking is then selected to receive a workload may be based on a score. The score may be determined based at least in part, on utilization, a saturation parameter and a capacity factor. The capacity factor is related to an amount of oversubscription practiced by a data center, e.g., data center 104. Score determination and ranking of compute nodes may be performed periodically and/or intermittently. Selection of a highest ranked node may be performed at initial placement of a workload and/or during operation, e.g., in response to a rebalancing. The selecting may be based, at least in part, on the ranking. Thus, compute nodes selected to receive a workload may be selected within their deployment context.

Figure 3A:
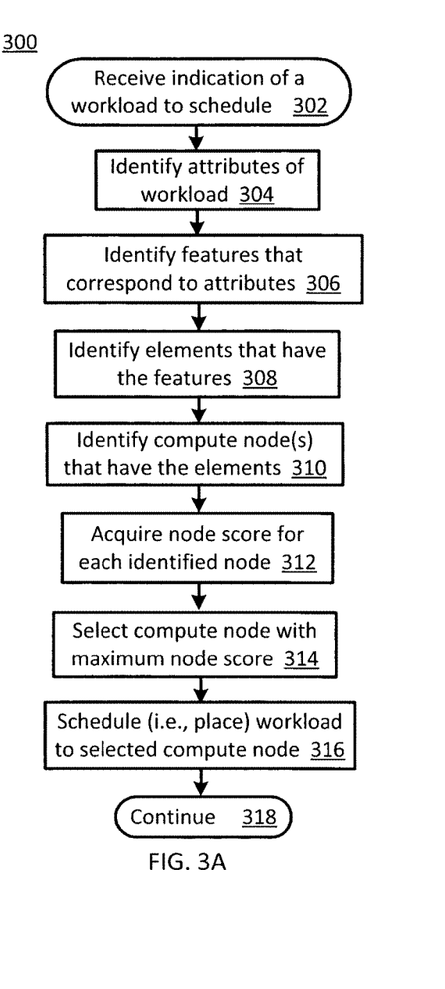
FIG. 3A is a flowchart of computer node selection operations according to various embodiments of the present disclosure.

FIG. 3A is a flowchart 300 of compute node selection operations according to various embodiments of the present disclosure. In particular, the flowchart 300 illustrates identifying attributes of workloads and features that correspond to attributes to support selection of a compute node for placement of a workload. The operations may be performed, for example, by filter logic 126, ranker logic 128 and/or orchestrator 106 of FIG. 1.

Operations of this embodiment may begin with receiving an indication of a workload to schedule at operation 302. Attributes of the workload may be identified at operation 304. Operation 306 includes identifying features that correspond to the attributes. For example, the features may be associated with one or more physical elements included in a data center, e.g., data center 104. Physical elements that have the features may be identified at operation 308. Compute node(s) that have the elements may be identified at operation 310. Node scores for each identified node may be acquired at operation 312. The compute node with the maximum node score may be selected at operation 314. The received workload may be scheduled (i.e., placed) to the selected compute node at operation 316. Program flow may then continue at operation 318.

Figure 3B:
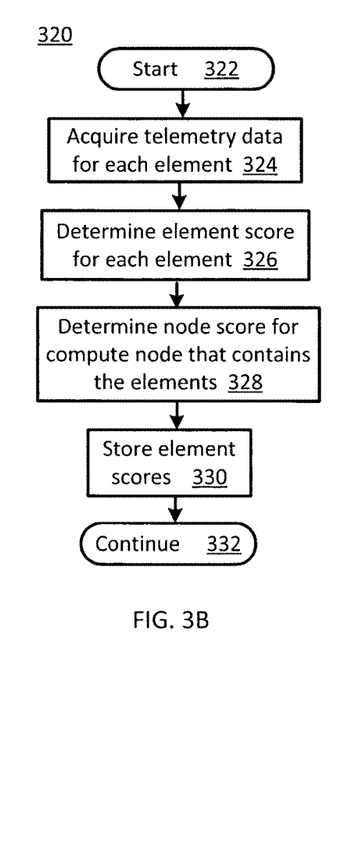
FIG. 3B is a flowchart of ranking operations according to various embodiments of the present disclosure.

FIG. 3B is a flowchart 320 of ranking operations according to various embodiments of the present disclosure. In particular, flowchart 320 illustrates operations that may be performed generally continuously to update rankings. The operations may be performed for example by ranker logic 128 of FIG. 1.

Operations of this embodiment may begin with start 322. Telemetry data may be acquired for each element at operation 324. For example, telemetry data may be acquired from telemetry 116. An element score, $score_i$, may be determined for each element at operation 326. For example, the element score may be acquired from, e.g., orchestrator 106. A node score may be determined for each compute node that contains the elements at operation 328. For example, the node score may correspond to an average of the element scores included in the associated compute node. The element scores may be stored at operation 330. For example, the element scores may be stored to graph model 110 and/or score store 130. Thus, each element and/or compute node may be ranked generally periodically.

Figure 3C:
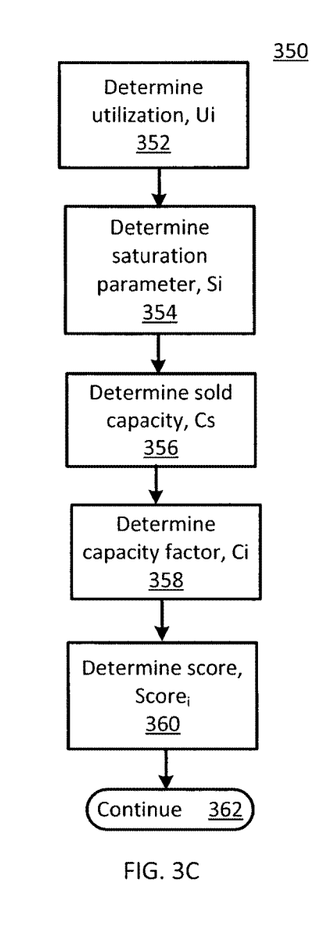
FIG. 3C is a flowchart of score determination operations for the ranking operations of FIG. 3B.

FIG. 3C is a flowchart 350 of score determination operations for the ranking operations of FIG. 3B. In particular, the flowchart 350 corresponds to operation 326 of FIG. 3B. The operations may be performed, for example, by ranker logic 128 and/or orchestrator 106 of FIG. 1.

Operations of this embodiment may begin with determining utilization, $U_i$, at operation 352. Operation 354 includes determining saturation parameter, $S_i$. A sold capacity, $C_s$, may be determined at operation 356. A capacity factor, $C_i$, may be determined at operation 358. A score, $score_i$, may then be determined at operation 360 based, at least in part, on $U_i$, $S_i$ and $C_i$. Program flow may then continue at operation 362.

Thus, element scores may be determined, node scores may be determined for compute nodes that include one or more of the scored physical elements, compute nodes may be ranked according to node score and the highest ranked compute node may be selected to receive a workload.

Figure 4:
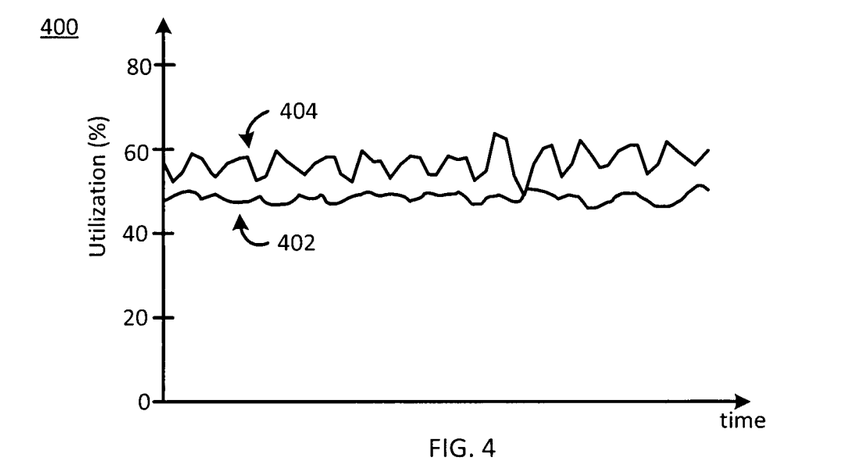
FIG. 4 is a plot of example utilization for two compute nodes, selected according to rank.

FIG. 4 is a plot 400 of example utilization for two compute nodes, selected according to rank. The vertical axis is utilization in percent. The horizontal axis is time in minutes. A first curve 402 corresponds to a first compute node and a second curve 404 corresponds to a second compute node. For this example, the data acquisition interval was 1 second, i.e., utilization was determined at 1 second intervals, with a look back period of 10 minutes. The workloads are generally nearly evenly distributed between the two compute nodes and utilization is near 50% for each compute node.

Figure 5:
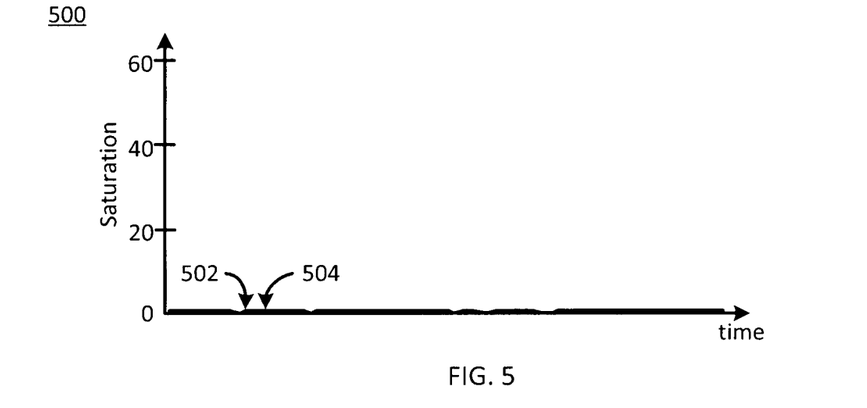
FIG. 5 is a plot of example saturation for the two compute nodes of FIG. 4.

FIG. 5 is a plot 500 of example saturation for the two compute nodes of FIG. 4. The vertical axis is a percentage corresponding to a fraction of saturation occurrences. The range of values of saturation occurrences had a lower bound of zero and an undefined upper bound. The saturation occurrences were determined for the same data acquisition interval and look back period as the utilization information illustrated in FIG. 4. The sample interval for saturation samples was 1 second. The incidents of saturation were negligible as illustrated by curves 502, 504, corresponding to the first compute node and second compute node, of FIG. 4.

Figure 6:
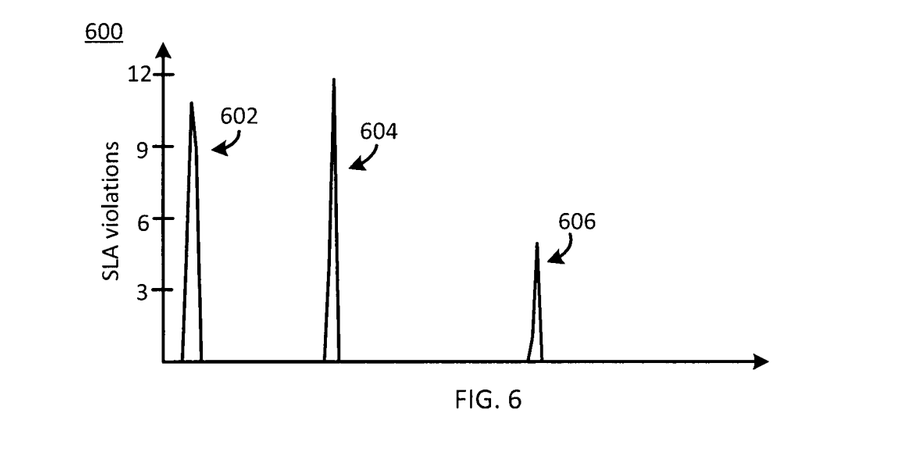
FIG. 6 is a plot of service level agreement (SLA) violations for one example ranking system.

FIG. 6 is a plot 600 of service level agreement (SLA) violations for one example ranking system. The vertical axis is SLA violations in units of frame drops per minute. The horizontal axis is time, in units of minutes. Three incidences 602, 604 and 606 of non-zero SLA violations are illustrated. The first SLA violation 602 occurred at time 12, with a peak value of 10. Similarly, the second SLA violation 604 occurred at time 8, with a peak value of 12 and the third SLA violation 606 occurred at time 16, with a peak value of 5. It is contemplated that by scheduling and placing workloads as described herein, SLA violations may be less frequent compared to, e.g., a bin packing scheduler.

While the flowcharts of FIGS. 3A, 3B and 3C illustrates operations according various embodiments, it is to be understood that not all of the operations depicted in FIGS. 3A through 3C are necessary for other embodiments. In addition, it is fully contemplated herein that in other embodiments of the present disclosure, the operations depicted in FIGS. 3A, 3B and/or 3C and/or other operations described herein may be combined in a manner not specifically shown in any of the drawings, and such embodiments may include less or more operations than are illustrated in FIGS. 3A, 3B and 3C. Thus, claims directed to features and/or operations that are not exactly shown in one drawing are deemed within the scope and content of the present disclosure.

Thus, an apparatus, method and/or system are configured to rank a plurality of compute nodes based, at least in part, on a score. The ranking may be performed in response to a request to schedule a workload based, at least in part, on element and/or node scores determined periodically. An element score may be determined for each physical element contained in a compute node based, at least in part, on utilization, a saturation parameter and a capacity factor related to a sold capacity. The utilization, saturation parameter and sold capacity may be determined based, at least in part, on acquired telemetry data. A node score may be determined for the compute node based, at least in part, on the element scores of the elements contained in the compute node. The compute node with the highest node score may then be selected for placement of the workload.

Thus, workloads may be distributed, i.e., placed, according to deployment context. Utilization of compute nodes may be generally more uniform, incidents of saturation may be generally reduced compared to, e.g., a bin packing scheduler and occurrence of SLA violations may be reduced.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., processor 120, 140. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units.

Network interfaces, e.g., network interface 146, may be capable of communicating using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, network interface 146 may be capable of communicating using an X.25 communications protocol. The X.25 communications protocol may comply or be compatible with a standard promulgated by the International Telecommunication Union-Telecommunication Standardization Sector (ITU-T). Alternatively or additionally, network interface 146 may be capable of communicating using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network interface 146 may be capable of communicating using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Memory 122 and memory subsystems, e.g., memory subsystem 142, may each include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, an apparatus, method and/or system are configured to rank a plurality of compute nodes based, at least in part, on a score. An element score may be determined for each physical element contained in a compute node based, at least in part, on utilization, a saturation parameter and a capacity factor related to a sold capacity. The utilization, saturation parameter and sold capacity may be determined based, at least in part, on acquired telemetry data. A node score may be determined for the compute node based, at least in part, on the element scores of the elements contained in the compute node. The compute node with the highest node score may then be selected for placement of the workload. Utilization of compute nodes may then be relatively more uniform, saturation incidents may be reduced and occurrences of SLA violation may be reduced compared to, e.g., a bin packing scheduler.

EXAMPLES

Examples of the present disclosure include subject material such as a method, means for performing acts of the method, a device, or of an apparatus or system related to a ranking system, as discussed below.

Example 1

According to this example, there is provided an apparatus. The apparatus includes ranker logic to determine an element score ($score_i$) for a physical element in a data center. The element score is determined based, at least in part, on a utilization ($U_i$), a saturation parameter ($S_i$) and a capacity factor ($C_i$). The capacity factor is determined based, at least in part, on a sold capacity ($C_s$) related to the physical element.

Example 2

This example includes the elements of example 1, wherein the ranker logic is further to determine a node score for a compute node that contains the physical element.

Example 3

This example includes the elements of example 1, wherein the element score is determined as:

$$score_i = (1 - S_i) * \frac{C_i}{1 + U_i}.$$

Example 4

This example includes the elements according to any one of examples 1 to 3, wherein the capacity factor is equal to one when the sold capacity is less than a guard capacity, zero if the sold capacity is greater than a potential capacity and between one and a capacity threshold ($C_T$) if the sold capacity is between the guard capacity and the potential capacity.

Example 5

This example includes the elements according to any one of examples 1 to 3, wherein the physical element is selected from the group including a processor, a memory subsystem, a storage device, a network interface, a coprocessor, a network switch and an other element.

Example 6

This example includes the elements of example 2, wherein the ranker logic is to determine a respective element score for each of a plurality of physical elements, the plurality of physical elements contained in the compute node.

Example 7

This example includes the elements of example 6, wherein the node score is determined based, at least in part, on the respective element score of each of the plurality of elements.

Example 8

This example includes the elements according to any one of examples 1 to 3, further including filter logic to identify an attribute of a workload, to identify a feature that corresponds to the attribute and to determine whether the physical element has the feature.

Example 9

This example includes the elements of example 8, wherein the filter logic is to identify a compute node that contains the physical element and to acquire a node score for the identified compute node if the physical element has the feature.

Example 10

This example includes the elements according to any one of examples 1 to 3, wherein the ranker is to determine the element score periodically.

Example 11

This example includes the elements according to any one of examples 1 to 3, wherein the ranker logic is to select a compute node from a plurality of compute nodes, the selected compute node having a maximum node score relative to other compute nodes.

Example 12

According to this example, there is provided a method. The method includes determining, by ranker logic, an element score ($score_i$) for a physical element in a data center, the element score determined based, at least in part, on a utilization ($U_i$), a saturation parameter ($S_i$) and a capacity factor ($C_i$), the capacity factor determined based, at least in part, on a sold capacity ($C_s$) related to the physical element.

Example 13

This example includes the elements of example 12, further including determining, by the ranker logic, a node score for a compute node that contains the physical element.

Example 14

This example includes the elements of example 12, wherein the element score is determined as:

$$score_i = (1 - S_i) * \frac{C_i}{1 + U_i}.$$

Example 15

This example includes the elements of example 12, wherein the capacity factor is equal to one when the sold capacity is less than a guard capacity, zero if the sold capacity is greater than a potential capacity and between one and a capacity threshold ($C_T$) if the sold capacity is between the guard capacity and the potential capacity.

Example 16

This example includes the elements of example 12, wherein the physical element is selected from the group including a processor, a memory subsystem, a storage device, a network interface, a coprocessor, a network switch and an other element.

Example 17

This example includes the elements of example 13, further including determining, by the ranker logic, a respective element score for each of a plurality of physical elements, the plurality of physical elements contained in the compute node.

Example 18

This example includes the elements of example 17, wherein the node score is determined based, at least in part, on the respective element score of each of the plurality of elements.

Example 19

This example includes the elements of example 12, further including identifying, by filter logic, an attribute of a workload; identifying, by the filter logic, a feature that corresponds to the attribute; and determining, by the filter logic, whether the physical element has the feature.

Example 20

This example includes the elements of example 19, further including identifying, by the filter logic, a compute node that contains the physical element and acquiring, by the filter logic, a node score for the identified compute node if the physical element has the feature.

Example 21

This example includes the elements of example 12, wherein the ranker is to determine the element score periodically.

Example 22

This example includes the elements of example 12, further including selecting, by the ranker logic, a compute node from a plurality of compute nodes, the selected compute node having a maximum node score relative to other compute nodes.

Example 23

According to this example, there is provided a computer readable storage device. The device has stored thereon instructions that when executed by one or more processors result in the following operations including determining an element score ($score_i$) for a physical element in a data center, the element score determined based, at least in part, on a utilization ($U_i$), a saturation parameter ($S_i$) and a capacity factor ($C_i$), the capacity factor determined based, at least in part, on a sold capacity ($C_s$) related to the physical element.

Example 24

This example includes the elements of example 23, wherein the instructions that when executed by one or more processors results in the following additional operations including determining a node score for a compute node that contains the physical element.

Example 25

This example includes the elements of example 23, wherein the element score is determined as:

$$score_i = (1 - S_i) * \frac{C_i}{1 + U_i}.$$

Example 26

This example includes the elements according to any one of examples 23 to 25, wherein the capacity factor is equal to one when the sold capacity is less than a guard capacity, zero if the sold capacity is greater than a potential capacity and between one and a capacity threshold ($C_T$) if the sold capacity is between the guard capacity and the potential capacity.

Example 27

This example includes the elements according to any one of examples 23 to 25, wherein the physical element is selected from the group including a processor, a memory subsystem, a storage device, a network interface, a coprocessor, a network switch and an other element.

Example 28

This example includes the elements of example 24, wherein the instructions that when executed by one or more processors results in the following additional operations including determining a respective element score for each of a plurality of physical elements, the plurality of physical elements contained in the compute node.

Example 29

This example includes the elements of example 28, wherein the node score is determined based, at least in part, on the respective element score of each of the plurality of elements.

Example 30

This example includes the elements according to any one of examples 23 to 25, wherein the instructions that when executed by one or more processors results in the following additional operations including identifying an attribute of a workload; identifying a feature that corresponds to the attribute; and determining whether the physical element has the feature.

Example 31

This example includes the elements of example 30, wherein the instructions that when executed by one or more processors results in the following additional operations including identifying a compute node that contains the physical element and acquiring a node score for the identified compute node if the physical element has the feature.

Example 32

This example includes the elements according to any one of examples 23 to 25, wherein the ranker is to determine the element score periodically.

Example 33

This example includes the elements according to any one of examples 23 to 25, wherein the instructions that when executed by one or more processors results in the following additional operations including selecting a compute node from a plurality of compute nodes, the selected compute node having a maximum node score relative to other compute nodes.

Example 34

According to this example, there is provided a system. The system includes a processor; memory; and a ranking system. The ranking system includes ranker logic to determine an element score ($score_i$) for a physical element in a data center, the element score determined based, at least in part, on a utilization ($U_i$), a saturation parameter ($S_i$) and a capacity factor ($C_i$), the capacity factor determined based, at least in part, on a sold capacity ($C_s$) related to the physical element.

Example 35

This example includes the elements of example 34, wherein the ranker logic is further to determine a node score for a compute node that contains the physical element.

Example 36

This example includes the elements of example 34, wherein the element score is determined as:

$$score_i = (1 - S_i) * \frac{C_i}{1 + U_i}.$$

Example 37

This example includes the elements according to any one of examples 34 to 36, wherein the capacity factor is equal to one when the sold capacity is less than a guard capacity, zero if the sold capacity is greater than a potential capacity and between one and a capacity threshold ($C_T$) if the sold capacity is between the guard capacity and the potential capacity.

Example 38

This example includes the elements according to any one of examples 34 to 36, wherein the physical element is selected from the group including a processor, a memory subsystem, a storage device, a network interface, a coprocessor, a network switch and an other element.

Example 39

This example includes the elements of example 35, wherein the ranker logic is to determine a respective element score for each of a plurality of physical elements, the plurality of physical elements contained in the compute node.

Example 40

This example includes the elements of example 39, wherein the node score is determined based, at least in part, on the respective element score of each of the plurality of elements.

Example 41

This example includes the elements according to any one of examples 34 to 36, further including filter logic to identify an attribute of a workload, to identify a feature that corresponds to the attribute and to determine whether the physical element has the feature.

Example 42

This example includes the elements of example 41, wherein the filter logic is to identify a compute node that contains the physical element and to acquire a node score for the identified compute node if the physical element has the feature.

Example 43

This example includes the elements according to any one of examples 34 to 36, wherein the ranker is to determine the element score periodically.

Example 44

This example includes the elements according to any one of examples 34 to 36, wherein the ranker logic is to select a compute node from a plurality of compute nodes, the selected compute node having a maximum node score relative to other compute nodes.

Example 45

According to this example, there is provided an apparatus. The apparatus includes ranker logic to rank each of a plurality of compute nodes in a data center based, at least in part, on a respective node score. Each node score is determined based, at least in part, on a utilization (U), a saturation parameter (S) and a capacity factor ($C_i$). The capacity factor is determined based, at least in part, on a sold capacity ($C_s$) related to the compute node. The ranker logic is further to select one compute node with a highest node score for placement of a received workload.

Example 46

This example includes the elements of example 45, further including filter logic to traverse a graph model to identify one or more compute nodes that contain one or more physical elements that correspond to one or more features of the received workload.

Example 47

This example includes the elements of example 46, wherein the ranker logic is further to determine a respective node score for each identified compute node.

Example 48

This example includes the elements of example 45, wherein each node score is updated periodically.

Example 49

This example includes the elements of example 48, wherein an existing workload is scheduled to a different compute node in response to detection of a service level agreement violation associated with the existing workload, the different compute node selected based, at least in part, on the updated node scores.

Example 50

This example includes the elements of example 49, wherein each compute node includes at least one physical element, each node score related to at least one element score.

Example 51

This example includes the elements of example 50, wherein each of the at least one physical element is arranged in a disaggregated pool of physical elements.

Example 52

According to this example, there is provided a method. The method includes ranking, by ranker logic, each of a plurality of compute nodes in a data center based, at least in part, on a respective node score. Each node score is determined based, at least in part, on a utilization (U), a saturation parameter (S) and a capacity factor ($C_i$). The capacity factor is determined based, at least in part, on a sold capacity ($C_s$) related to the compute node. The method further includes selecting, by the ranker logic, one compute node with a highest node score for placement of a received workload.

Example 53

This example includes the elements of example 52, further including traversing, by filter logic, a graph model to identify one or more compute nodes that contain one or more physical elements that correspond to one or more features of the received workload.

Example 54

This example includes the elements of example 53, further including determining, by the ranker logic, a respective node score for each identified compute node.

Example 55

This example includes the elements of example 52, wherein each node score is updated periodically.

Example 56

This example includes the elements of example 55, wherein an existing workload is scheduled to a different compute node in response to detection of a service level agreement violation associated with the existing workload, the different compute node selected based, at least in part, on the updated node scores.

Example 57

This example includes the elements of example 56, wherein each compute node includes at least one physical element, each node score related to at least one element score.

Example 58

This example includes the elements of example 57, wherein each of the at least one physical element is arranged in a disaggregated pool of physical elements.

Example 59

According to this example, there is provided a computer readable storage device. The device has stored thereon instructions that when executed by one or more processors result in the following operations including ranking each of a plurality of compute nodes in a data center based, at least in part, on a respective node score, each node score determined based, at least in part, on a utilization (U), a saturation parameter (S) and a capacity factor ($C_i$), the capacity factor determined based, at least in part, on a sold capacity ($C_s$) related to the compute node; and selecting one compute node with a highest node score for placement of a received workload.

Example 60

This example includes the elements of example 59, wherein the instructions that when executed by one or more processors results in the following additional operations including traversing, by filter logic, a graph model to identify one or more compute nodes that contain one or more physical elements that correspond to one or more features of the received workload.

Example 61

This example includes the elements of example 60, wherein the instructions that when executed by one or more processors results in the following additional operations including determining, by the ranker logic, a respective node score for each identified compute node.

Example 62

This example includes the elements of example 59, wherein each node score is updated periodically.

Example 63

This example includes the elements of example 62, wherein an existing workload is scheduled to a different compute node in response to detection of a service level agreement violation associated with the existing workload, the different compute node selected based, at least in part, on the updated node scores.

Example 64

This example includes the elements of example 63, wherein each compute node includes at least one physical element, each node score related to at least one element score.

Example 65

This example includes the elements of example 64, wherein each of the at least one physical element is arranged in a disaggregated pool of physical elements.

Example 66

According to this example, there is provided a system. The system includes at least one device arranged to perform the method of any one of examples 12 to 22 or 52 to 58.

Example 67

According to this example, there is provided a device. The device includes means to perform the method of any one of examples 12 to 22 or 52 to 58.

Example 68

According to this example, there is provided a computer readable storage device. The device has stored thereon instructions that when executed by one or more processors result in the following operations including: the method according to any one of examples 12 through 22 or 52 to 58.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
ranker circuitry to rank each of a plurality of compute nodes in a data center based, at least in part, on a respective node score, each node score determined based, at least in part, on a utilization (U), a saturation parameter (S) and a capacity factor ($C_i$), the capacity factor determined based, at least in part, on a sold capacity ($C_s$) related to the compute node; wherein:
the ranker circuitry is further to:
select one compute node with a highest node score for placement of a received workload;
update each node score periodically to produce updated node scores;
schedule an existing workload to a different compute node in response to detection of a service level agreement violation associated with the existing workload, the different compute node selected based, at least in part, on the updated node scores; and
the saturation parameter (S) is a ratio of a count of a number of samples where a physical element included in or in proximity to a corresponding compute node was saturated to a total number of samples taken over a look back period.

2. The apparatus of claim 1, further comprising filter circuitry to traverse a graph model to identify one or more compute nodes that contain one or more physical elements that correspond to one or more features of the received workload.

3. The apparatus of claim 2, wherein the ranker circuitry is further to determine a respective node score for each identified compute node.

4. The apparatus of claim 1, wherein each compute node comprises at least one physical element, each node score related to at least one element score.

5. The apparatus of claim 4, wherein each of the at least one physical element is arranged in a disaggregated pool of physical elements.

6. A method comprising:
ranking, by ranker circuitry, each of a plurality of compute nodes in a data center based, at least in part, on a respective node score, each node score determined based, at least in part, on a utilization (U), a saturation parameter (S) and a capacity factor ($C_i$) the capacity factor determined based, at least in part, on a sold capacity ($C_s$) related to the compute node;
selecting, by the ranker circuitry, one compute node with a highest node score for placement of a received workload;
periodically updating, by the ranker circuitry, a respective node score for at least a subset of said plurality of compute nodes to produce updated node scores; and
selecting, by the ranker circuitry, a different compute node based at least in part on the updated node scores, and in response to detection of a service level agreement violation associated with the existing workload;
wherein the saturation parameter (S) is a ratio of a count of a number of samples where a physical element included in or in proximity to a corresponding compute node was saturated to a total number of samples taken over a look back period.

7. The method of claim 6, further comprising traversing, by filter circuitry, a graph model to identify one or more compute nodes that contain one or more physical elements that correspond to one or more features of the received workload.

8. The method of claim 7, further comprising determining, by the ranker circuitry, a respective node score for each identified compute node.

9. The method of claim 6, wherein each compute node comprises at least one physical element, each node score related to at least one element score.

10. The method of claim 9, wherein each of the at least one physical element is arranged in a disaggregated pool of physical elements.

11. A computer readable storage device having stored thereon instructions that when executed by one or more processors result in the following operations comprising:

ranking, with ranker circuitry, each of a plurality of compute nodes in a data center based, at least in part, on a respective node score, each node score determined based, at least in part, on a utilization (U), a saturation parameter (S) and a capacity factor ($C_i$) the capacity factor determined based, at least in part, on a sold capacity ($C_s$) related to the compute node;

selecting, with said ranker circuitry, one compute node with a highest node score for placement of a received workload;

periodically updating, with said ranker circuitry, a respective node score for at least a bset of said plurality of compute nodes to produce updated node scores; and selecting, with said ranker circuitry, a different compute node based at least in part on the updated node scores, and in response to detection of a service level agreement violation associated with the existing workload;

wherein the saturation parameter (S) is a ratio of a count of a number of samples where a physical element included in or in proximity to a corresponding compute node was saturated to a total number of samples taken over a look back period.

12. The device of claim 11, wherein the instructions that when executed by one or more processors results in the following additional operations comprising traversing, by filter circuitry, a graph model to identify one or more compute nodes that contain one or more physical elements that correspond to one or more features of the received workload.

13. The device of claim 12, wherein the instructions that when executed by one or more processors results in the following additional operations comprising determining, by the ranker circuitry, a respective node score for each identified compute node.

14. The device of claim 11, wherein each compute node comprises at least one physical element, each node score related to at least one element score.

15. The device of claim 14, wherein each of the at least one physical element is arranged in a disaggregated pool of physical elements.

* * * * *